J. F. MINNICH.
FENDER.
APPLICATION FILED MAR. 15, 1913.
1,095,017.
Patented Apr. 28, 1914.
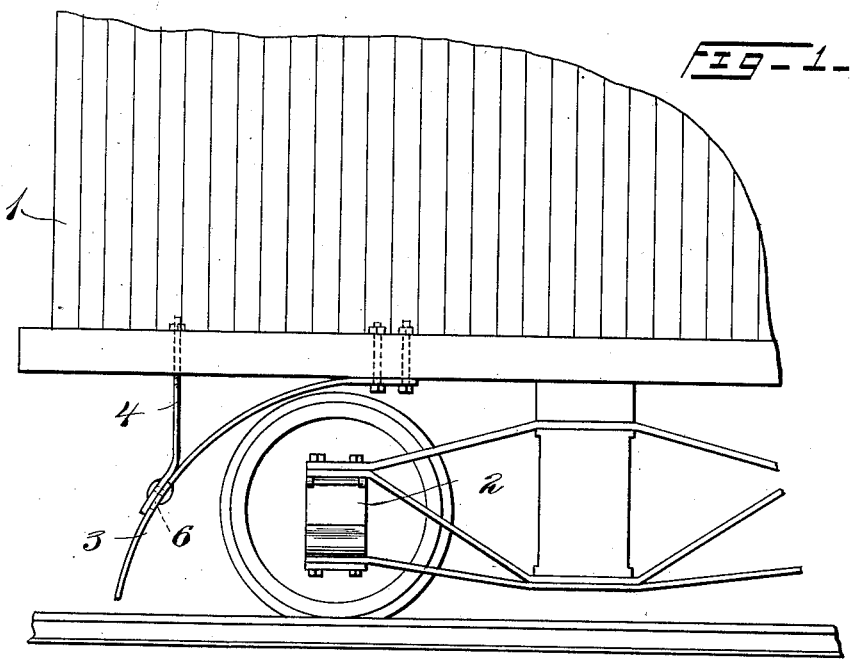
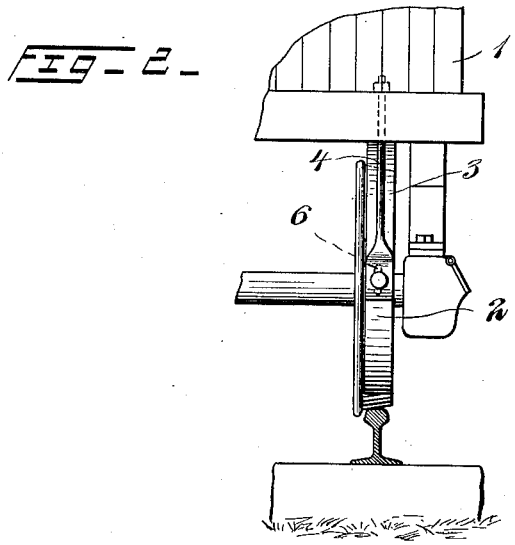
Witnesses
Inventor
J. F. Minnich
By Victor J. Evans
Attorney

UNITED STATES PATENT OFFICE.

JOSEPH F. MINNICH, OF FORT WAYNE, INDIANA.

FENDER.

1,095,017.

Specification of Letters Patent.  Patented Apr. 28, 1914.

Application filed March 15, 1913. Serial No. 754,407.

*To all whom it may concern:*

Be it known that I, JOSEPH F. MINNICH, a citizen of the United States, residing at Fort Wayne, in the county of Allen and State of Indiana, have invented new and useful Improvements in Fenders, of which the following is a specification.

This invention relates to fenders and the object of the invention is to provide a simple and efficient wheel fender for freight and other similar cars which will prevent the brakeman or person coupling or uncoupling the cars from accidentally having his limbs crushed by the wheels of a truck.

Another object of the invention is the provision of a guard of this character which is effectively braced to the body of the car whereby it is practically impossible for a person's limbs to get in between the truck and the body.

Further objects of the invention will appear as the following description is read in connection with the accompanying drawing, which forms a part of this application, and in which:—

Figure 1 is a side elevation and Fig. 2 is a detail end elevation of the fender and a portion of the car to which it is attached.

Referring more particularly to the drawing, 1 represents an ordinary freight car body which is supported upon the wheeled truck 2. Secured to the underneath side of the body is a forwardly and downwardly curved guard 3 which is connected intermediate its length with the car body by a brace rod 4. The upper end of the guard extends over the wheel, as shown, while the lower end extends downwardly adjacent the track, the guard being located immediately over the tread of the wheel.

The brace is bolted to the guard and the guard is preferably provided with a slot 6 by which the distance between the lower end of the guard and the track may be properly regulated, the upper end of the brace being secured to the car body in any suitable manner and the guard and brace having sufficient resiliency to permit this adjustment.

What I claim is:—

The combination with a car body, of a wheel guard secured at one end to the body and comprising a forwardly and downwardly curved guard spring rod or bar overhanging the wheel, means for securing the upper end of the same to the car body over the wheel, a brace connected to the car body and a slidable connection between the lower end of the brace and an intermediate point on the guard rod.

In testimony whereof I affix my signature in presence of two witnesses.

JOSEPH F. MINNICH.

Witnesses:
F. C. KABISCH,
W. T. SIMMONS.

Copies of this patent may be obtained for five cents each, by addressing the "Commissioner of Patents, Washington, D. C."